June 3, 1924.
A. HELFENSTEIN
CLOSED ELECTRIC FURNACE
Filed Feb. 7, 1922
1,496,674
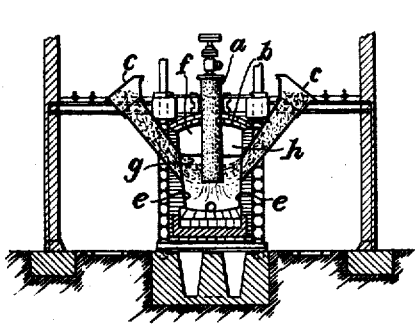
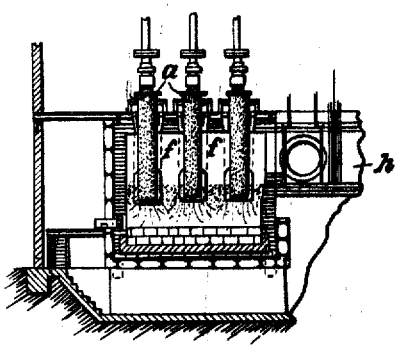
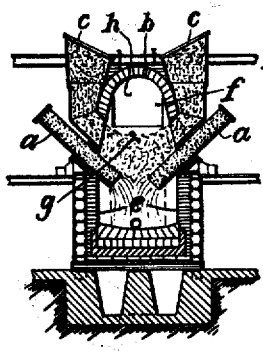
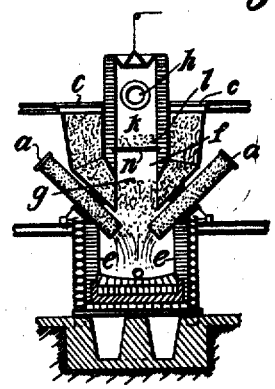
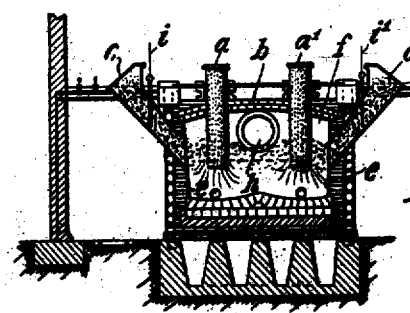

Patented June 3, 1924.

1,496,674

UNITED STATES PATENT OFFICE.

ALOIS HELFENSTEIN, OF VIENNA, AUSTRIA, ASSIGNOR TO UNION CARBIDE COMPANY, OF NEW YORK, N. Y., A CORPORATION OF VIRGINIA.

CLOSED ELECTRIC FURNACE.

Application filed February 7, 1922. Serial No. 534,737.

*To all whom it may concern:*

Be it known that I, ALOIS HELFENSTEIN, a citizen of Switzerland, residing at 50 Bas tiongasse XVIII, Vienna, Austria, have invented certain new and useful Improvements in Closed Electric Furnaces, of which the following is a specification.

The present invention relates to a closed electric furnace.

The invention has for its principal object a closed electric furnace, including shafts for continuous charging, in which provision is made for advantageously recovering pure furnace gases.

Briefly stated, the invention consists in disposing the charging ports of the shafts in the side walls of the furnace at points relatively remote from the cover.

The advantages of this arrangement will appear more fully from the description of the invention by reference to the accompanying drawings in which—

Fig. 1 is a vertical transverse section of a furnace embodying the invention;

Fig. 2 is a vertical longitudinal section therefor; and

Figs. 3, 4 and 5 are vertical transverse sections showing different modifications of which the invention is susceptible.

In Figs. 1 and 2, is represented a typical furnace construction having an arched roof or cover $b$. The electrodes $a$ pass through the roof into the charge. The shafts $c$ converge toward each other and pass through the side walls $e$ of the furnace at a considerable distance from the roof $b$.

The material fed in through the shafts will naturally not level out in the furnace but will bank up along the side walls forming a trough which is deepest along the longitudinal center line.

Due to the particular disposition of the shafts the roof is materially above the charge; and the space $f$ defined by the trough-like surface of the charge, the side walls and the roof, constitutes a chamber of considerable capacity for the gases. This chamber naturally acts as an equalizer in the sense that it takes up and minimizes the surge effects frequently produced by sudden changes in the evolution of gas during the operation of the furnace.

Following the path of least resistance the gases rise mainly from the lowest part of the trough-like surface of the charge so that long hot flames shooting up from the center of the furnace are not likely to reach the side walls or the roof. The arrangement described thus affords a degree of protection not obtainable by other constructions of similar type.

The gases accumulating in the gas space or chamber may be conducted to the dust settler or other receiver through a horizontal flue $h$ forming substantially a continuation of space above the trough-like surface of the charge in the furnace.

In the arrangement shown in Fig. 3 the electrodes $a$ extend laterally into the furnace. In this particular construction, the roof $b$ forms a high arch comprising steep side walls. The shafts $c$ extend downwardly in contiguous relation to the side walls to near the bottom thereof and have an angular portion passing through the side walls. The angular relation of these portions is substantially the same as that of the shafts $cc$ in Figs. 1 and 2, so that the charge in the furnace has a trough-like surface as previously described. The space $f$ defined by the arch of the roof and the charge forms a gas space which has substantially the same characteristics as the gas space previously described.

The relation of the shafts and the walls of the furnace in this construction afford a greater utilization of the heat given off from the walls of the furnace, principally by radiation, to preheat the material in the shafts.

The construction shown in Fig. 4 is generally like the construction disclosed in Figs. 1 and 2 with the difference, however, that two sets of electrodes $aa$ are employed. In fact the arrangement may be considered as a combination of two furnaces of the type shown in Figs. 1 and 2. The characteristics are essentially the same. While the surface of the charge in the furnace is somewhat changed due to the differences in construction, the material presents necessarily a distinctly trough-like shape lengthwise of the furnace with the advantages pointed out.

It may be advisable to provide gates $i$ in the shafts for controlling the level of the material in the furnace during operation, since for efficient operation of the furnace the level of the material above the ends of the electrodes must vary as a function of the energy input. While these gates are shown only in Fig. 4, they are not intended as limited thereto but are generally applicable to all the forms. They are referred to in this figure merely for the sake of convenience.

The form of construction in Fig. 5 is generally similar to the construction shown in Fig. 3. It differs therefrom principally in regard to the manner in which the gases are conducted away from the gas space $f$. In this particular construction a shaft extends upwardly from the roof and has an outlet $h$. Upon a grate $n$ may be placed granular material $l$ through which the furnace gases are drawn. The mass of granular material operates to free the gases from dust and particles suspended therein and also cools the gases. It is understood that the application of filters is by no means limited to this form of construction. The disclosure in this respect is intended merely as indicating the general applicability of dust filters in the gas space outside the furnace and independent of the mixture therein.

Should the gas contain carbon dioxide or water vapor, the filter bed might consist of coke or any other suitable form of carbon, or even of the furnace mixture itself, in any event giving rise to the well-known reaction between highly heated carbon and carbon dioxide and carbon and water vapor, respectively, thus forming carbon monoxide and hydrogen, a reaction which cools the gas and at the same time materially enriches it.

In all constructions disclosed, due to the particular arrangement of the shafts, leakage or uncontrolled flow of air into the gas space is practically prevented. The cross-sectional area of the shafts is such that the material, under the weight of the columns therein, continuously passes into the furnace at the rate of consumption of the charge in the latter.

The arrangement permits of local additions from the ends of the furnace directly into the zone of hottest reaction. The construction also permits stoking the contents of the furnace through the charging shafts or laterally thereof.

Furnaces of the above type find their principal application in the electric smelting of calcium carbide, pig iron, etc.; where the reaction of pure carbon monoxide is desired, as well as for the production of gaseous products, such as zinc, phosphorus, phosphorous pentoxide and similar substances which are products of distillation processes.

I claim:

1. The mode of operating a closed electric furnace, which consists in continuously feeding the material through the side walls at points a substantial distance below the roof thereof in such a way as to maintain columns of the material above the point of entrance at a height sufficient to prevent entrance of air into the furnace and leakage of gas out of the furnace.

2. The mode of operating a closed electric furnace, which consists in continuously and uniformly feeding the material through the side walls at points a substantial distance below the roof thereof in such a way as to maintain columns of the material above the point of entrance at a height sufficient to prevent entrance of air into the furnace and leakage of gas out of the furnace and furthermore in such a way that the charge in the furnace forms a trough lengthwise of the furnace.

3. A closed electric furnace comprising charging shafts extending through opposite side walls at points materially below the roof whereby a gas space is formed above the surface of the charge and the shafts being so disposed that the surface of the charge defines a central trough running lengthwise of the furnace.

4. A closed electric furnace comprising charging shafts extending through the side walls of the furnace at a considerable distance below the roof in such a way that the charge passing into the furnace continuously forms a trough lengthwise thereof, the shafts being of sufficient height so that the columns of material therein substantially prevent the ingress of air into and the escape of gas from the furnace.

5. Electric furnace according to claim 4 in which the cross-sectional area of the shafts is such that the material therein will, under the weight of the columns, continuously pass into the furnace at the rate of consumption of the charge in the latter.

6. Electric furnace according to claim 3 in which the shafts extend downwardly in intimate heat-exchanging relation to the outer surface of the furnace walls.

7. A closed electric furnace comprising charging shafts extending through the side walls of the furnace, said shafts being of sufficient height so that the columns of material therein substantially prevent the ingress of air into and the egress of gas from the furnace, and of sufficient cross-sectional area so that the material therein will, under the weight of the columns, continuously pass into the furnace at the rate of consumption of the charge in the latter.

8. Furnace according to claim 7 in which the shafts extend downwardly in intimate heat-exchanging relation to the furnace walls.

9. A closed electric furnace comprising charging shafts extending downwardly along the outer surface of the side walls in contiguous relation therewith and opening into the furnace at points materially below the roof, the arrangement being such that the upper portion of the side walls and the roof afford a relatively large gas space and that the surface of the charge defines a trough lengthwise of the furnace, a conduit connected with the gas space for drawing off the gases and means disposed in the gas space for filtering the gases.

10. A closed electric furnace comprising charging shafts extending through opposite side walls of the furnace and disposed to cause a banking-up of the material along the side walls, whereby the charge defines a central trough running lengthwise of the furnace and means for controlling the height of the material in the furnace.

ALOIS HELFENSTEIN.